United States Patent [19]

Shekhawat et al.

[11] Patent Number: 5,402,083

[45] Date of Patent: Mar. 28, 1995

[54] SHOOT-THROUGH PROTECTION CIRCUIT FOR IMPROVED STABILITY IN A NEUTRAL-POINT CLAMPED SYNTHESIZER

[75] Inventors: Sampat Shekhawat, Tinton Falls; Robert C. Eckenfelder, Point Pleasant, both of N.J.

[73] Assignee: AlliedSignal Inc., Morris Township, Morris County, N.J.

[21] Appl. No.: 73,027

[22] Filed: Jun. 7, 1993

[51] Int. Cl.[6] .............................................. H03L 7/16
[52] U.S. Cl. .................................... 327/107; 327/74; 327/384
[58] Field of Search ............... 307/351, 354, 360, 361, 307/364, 236, 494, 350, 231, 510, 525, 526, 528, 513, 261, 555, 557; 328/150, 146, 151, 14, 29

[56] References Cited

U.S. PATENT DOCUMENTS

| | | | |
|---|---|---|---|
| 3,639,779 | 2/1972 | Garrigus | 307/360 |
| 3,820,033 | 6/1974 | Iwata | 307/261 |
| 4,069,432 | 1/1978 | Bazin | 307/364 |
| 4,165,491 | 8/1979 | Geffon | 307/354 |
| 4,733,104 | 3/1988 | Steigerwald et al. | 307/265 |
| 4,771,188 | 9/1988 | Cheng et al. | 307/351 |
| 4,924,483 | 5/1990 | Cho | 307/354 |
| 5,045,800 | 9/1991 | Kung | 307/261 |

Primary Examiner—Timothy P. Callahan
Assistant Examiner—My-Trang Nu Ton
Attorney, Agent, or Firm—Verne E. Kreger, Jr.

[57] ABSTRACT

This invention provides for an enabling circuit that ensures a positive turn-on of semiconductor switches configured for the generation of a synthesized waveform, thereby eliminating misfiring of the switches due to electronic noise or logic malfunction. The circuit is configured to separately compare a sample waveform with a positive reference voltage and a negative reference voltage. The two results are directed to separate logic AND gates which have respective control signal inputs that regulate the formation of the positive and negative portion of a synthesized waveform. The output signals from the two AND gates connect to logic means to control the firing of the semiconductor switches.

3 Claims, 3 Drawing Sheets

5,402,083

SHOOT-THROUGH PROTECTION CIRCUIT FOR IMPROVED STABILITY IN A NEUTRAL-POINT CLAMPED SYNTHESIZER

FIELD OF THE INVENTION

The present invention relates to a sine wave synthesis controller circuit intended to be utilized in conjunction with a digitally-controlled neutral-point clamped inverter to produce a sinusoidal waveform from a direct voltage source, and in particular, provides a circuit that provides shoot-through protection and improves stability of the controller.

BACKGROUND OF THE INVENTION

The present invention relates to a sine wave controller circuit for use with a neutral-point clamped inverter as disclosed in U.S. Pat. No. 5,120,986 to S. Shekhawat, which is hereby incorporated by reference. The reference patent discloses a sine wave synthesis controller circuit intended to be utilized in conjunction with a digitally-controlled neutral-point clamped inverter to produce a sinusoidal waveform from a direct voltage source. The circuit is configured so that it provides two separate control signals, +PWM and −PWM, to the logic controller of the neutral-point clamped inverter. The +PWM control signal relates to the regulation of the positive portion of the synthesized waveform, and the −PWM control signal relates to the regulation of the negative portion of the synthesized waveform. These control signals direct the production of a sinusoidal waveform in response to a reference sine wave, the instantaneous voltage output of the neutral-point clamped inverter, and positive and negative reference voltages.

One problem associated with such waveform production is instability of the synthesized waveform as a result of noise and logic malfunction. There may be instances when either noise in the circuit or a logic malfunction shoot through the circuit and cause the +PWM and −PWM signals to be generated coincidentally. This malfunction causes the semiconductor switches in the neutral-point clamped inverter to fire simultaneously producing instability in the waveform.

SUMMARY OF THE INVENTION

This invention provides for a circuit that ensures a positive turn-on of semiconductor switches configured for the generation of a synthesized waveform, thereby eliminating misfiring of the switches due to electronic noise or logic malfunction. The circuit is configured to separately compare a sample waveform with a positive reference voltage and a negative reference voltage. The two results are directed to separate logic AND gates which also have control signal inputs that regulate the formation of the positive and negative portion of a synthesized waveform. The output signals from the two AND gates connect to logic means to control the firing of the semiconductor switches. Therefore, the invention positively enables the production of the positive and negative portions of the synthesized waveform.

In the preferred embodiment, the sample sine wave is the Output of the inverter that generates a sine wave from a DC voltage input.

BRIEF DESCRIPTION OF THE DRAWINGS

The above and other objects and advantages of this invention will be apparent on consideration of the following detailed description, taken in conjunction with the accompanying drawings, in which like reference characters refer to like parts throughout, and in which.

DETAILED DESCRIPTION OF THE INVENTION

Figure 1:
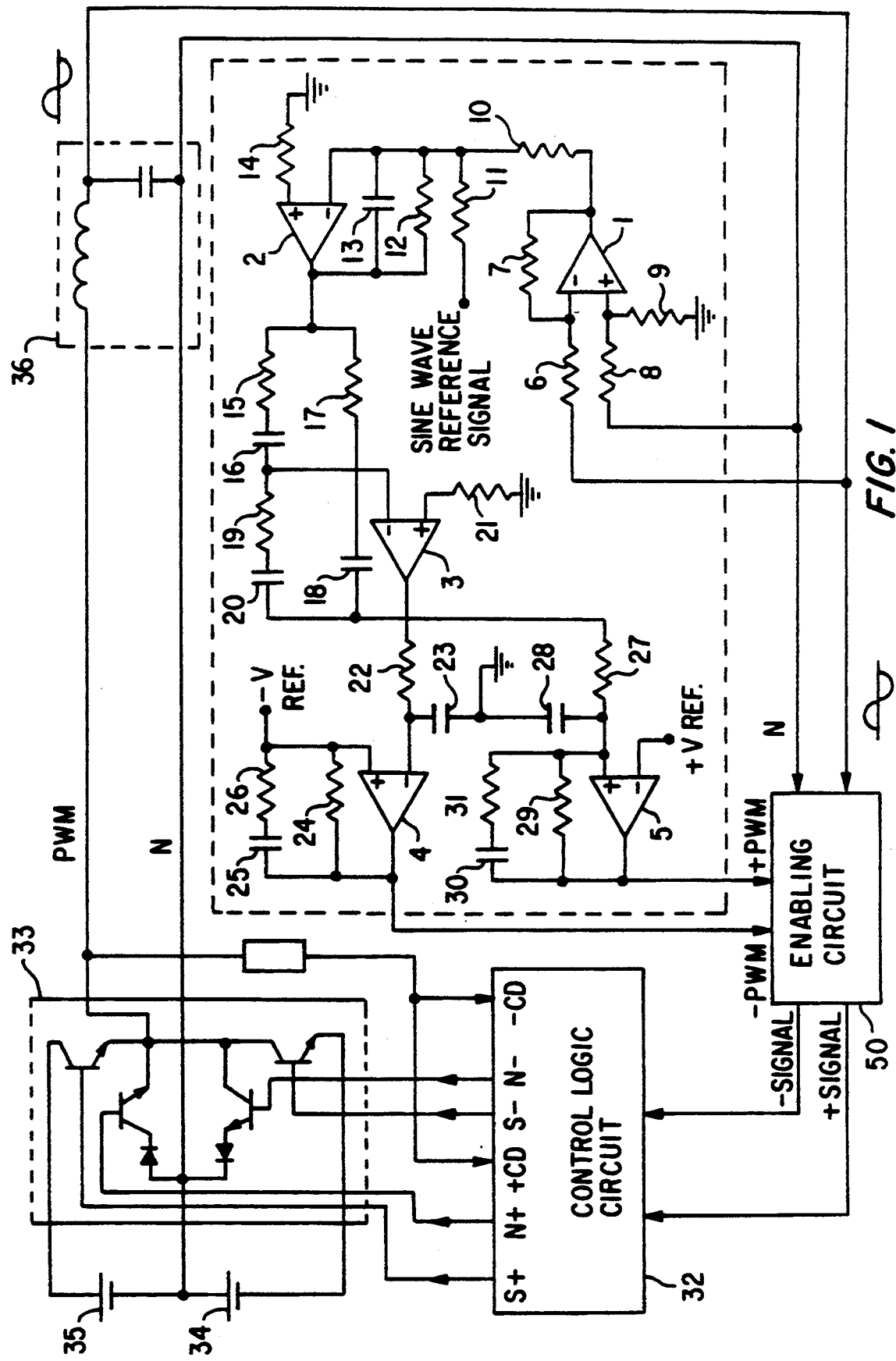
FIG. 1 is block diagram of the invention in connection with FIG. 3 of U.S. Pat. No. 5,120,986.
Figure 3:
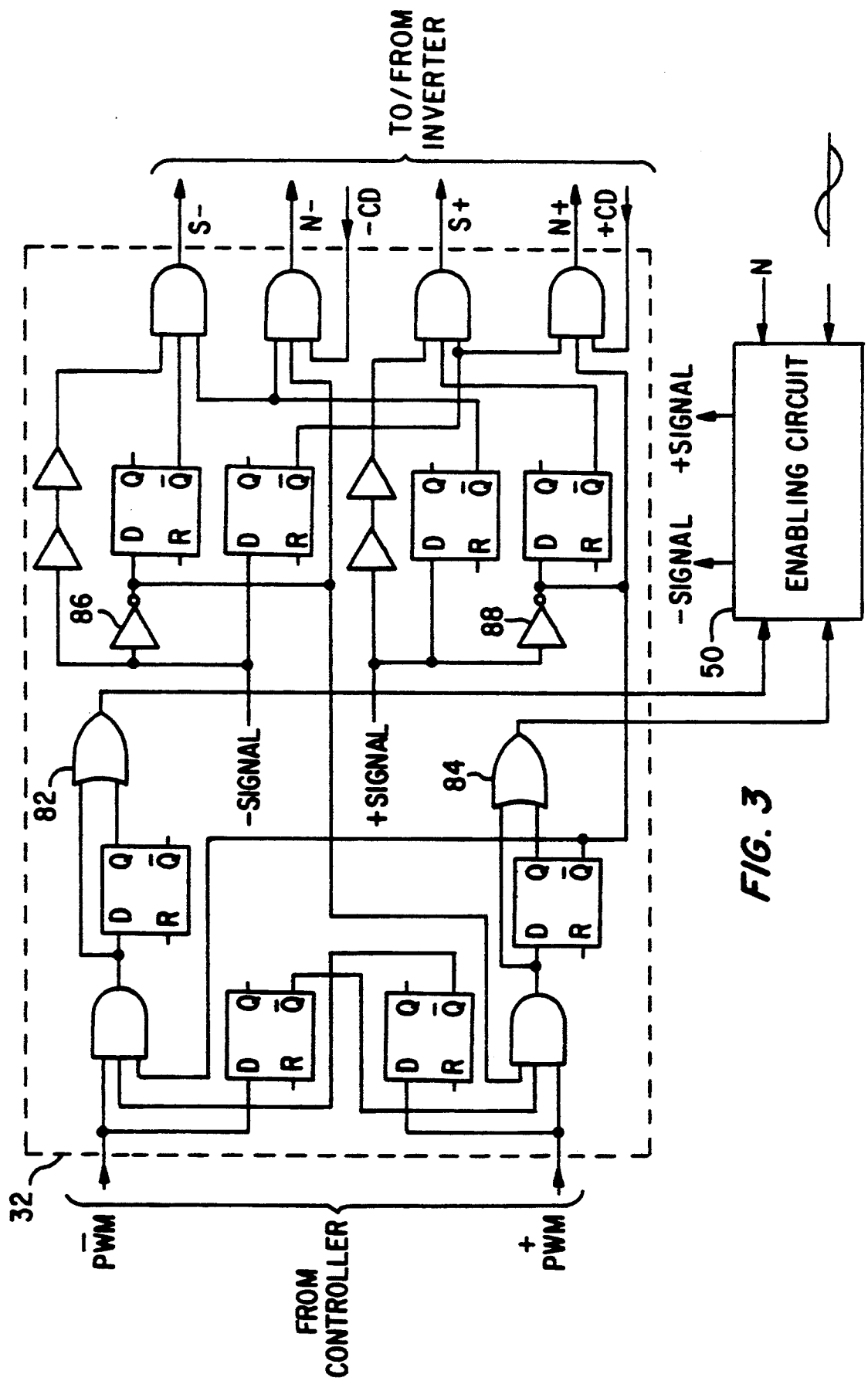
FIG. 3 is a block diagram of the invention in connection with FIG. 2 of U.S. Pat. No. 5,120,986.

FIG. 1 illustrates a block diagram of the enabling circuit 50 of the present invention in connection with FIG. 3 of U.S. Pat. No. 5,120,986, which is hereby incorporated by reference. Enabling circuit 50 is shown in conjunction with the application of the referenced patent by way of example only. For clarity, reference characters of the reference patent are duplicated here and are meant to refer back to the element described in the reference patent.

It is understood that the present invention can be successfully utilized with other means of generating an alternating waveform from a constant voltage supply or in other applications where positive logic turn-on is required.

Figure 2:
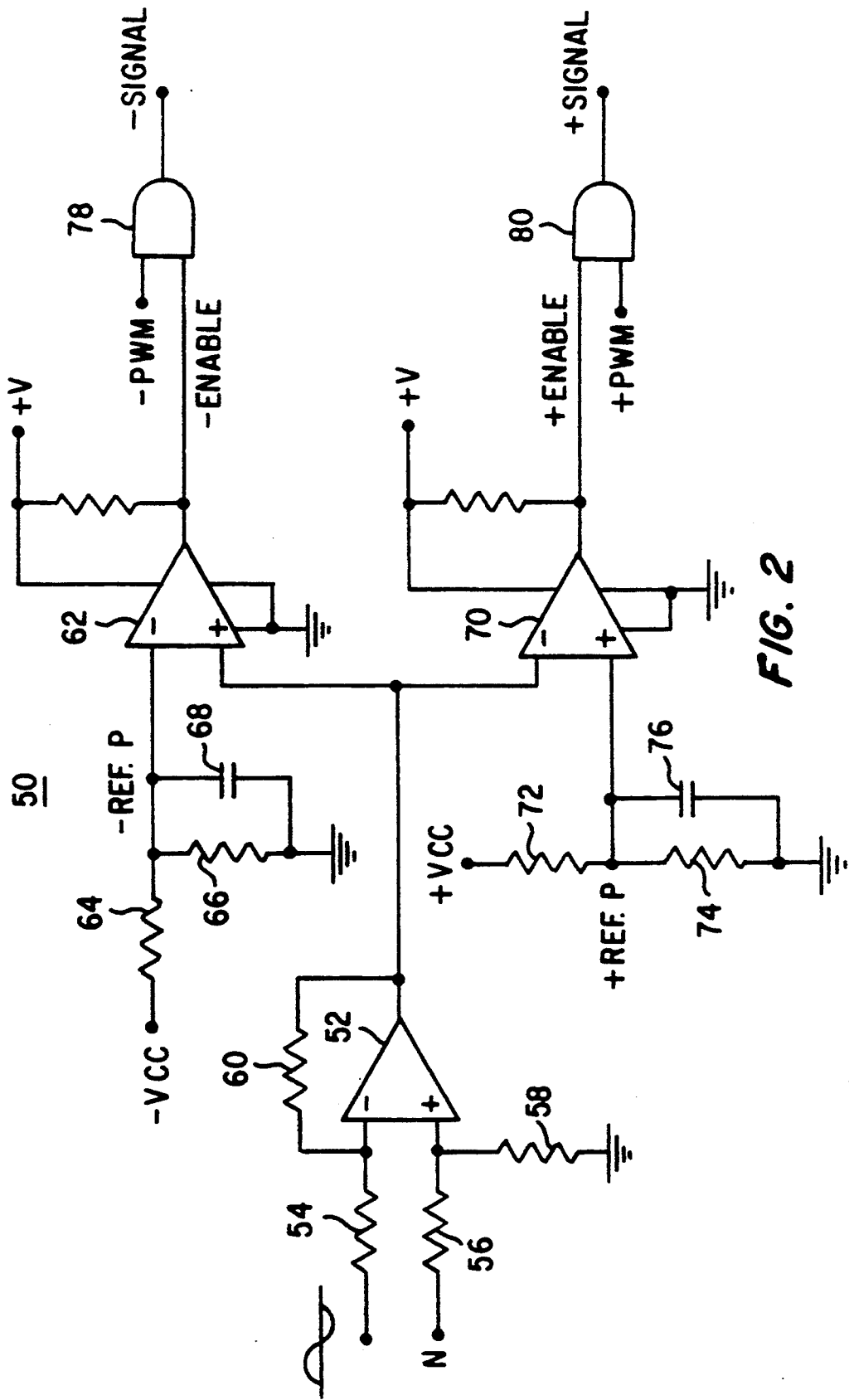
FIG. 2 is an schematic of the preferred embodiment of the invention.

A preferred embodiment of circuit 50 is shown in FIG. 2. Circuit 50 consists of three operational amplifiers and two logic AND gates arranged to compare a sample waveform to both a positive and negative reference signal. The resultant output to the control logic circuit 32 is a positive and negative signal to initiate production of a positive or a negative portion of a synthesized sine wave, respectively.

The inverting input terminal of the inverting op amp 52 is coupled to a sample waveform via input resistor 54. Preferably, the sample waveform is the output waveform from the neutral-point clamped inverter 33 at a point after the LC network 36. Other sample waveforms may be used, for example the sine wave reference signal (FIG. 1), so long as the other waveforms are in phase with the output of inverter 33. The noninverting input of op amp 52 is coupled to the neutral electrical reference signal N from inverter 33 via input resistor 56. The noninverting input is also connected to electrical ground via resistor 58. The output of op amp 52 provides a feedback signal to its inverting input via resistor 60 and also couples the inverted sample waveform to the noninverting input of comparator op amp 62 and the inverting input of comparator op amp 70.

Reference voltage $-V_{cc}$ connects with input resistor 64 and a parallel resistor 66 and capacitor 68 network to produce a precise reference voltage, −Ref P, which connects to the inverting input of op amp 62. The output of op amp 62, −ENABLE, couples with one input of a logic AND gate 78. The other input to AND gate 78 is signal −PWM generated from op amp 4 (FIG. 1). The output of AND gate 78 is a high logic signal, −SIGNAL, which inputs into control logic circuit 32.

Reference voltage $+V_{cc}$ connects with input resistor 72 and a parallel resistor 74 and capacitor 76 network to produce reference voltage +Ref P which connects to the noninverting input of op amp 70. The output of op amp 70, +ENABLE, couples with one input of a logic AND gate 80. The other input to AND gate 80 is signal +PWM generated from op amp 5 (FIG. 1). The output of AND gate 80 is a high logic signal, +SIGNAL, which inputs into control logic circuit 32.

In operation, the sample waveform is inverted by op amp 52 and output to comparator op amps 62 and 70. When the sample waveform is in its positive cycle, the output of op amp 52 will be a negative signal and compared with +Ref P and −Ref P. A voltage differential exists at the input of comparator op amp 70 which causes the output of op amp 70 to invert the negative signal to output high logic signal +ENABLE to an input of AND gate 80. A voltage differential does not exist at the input of op amp 62, and op amp 62 will not output high logic signal −ENABLE to AND gate 78. Since the sample waveform is in phase with the output of the waveform of inverter 33, high signal +PWM will be generated from negative comparator op amp 4 as described in the referenced patent. High signal +PWM is ANDED with high signal +ENABLE resulting in a high +SIGNAL output to control logic circuit 32. Hence, during the positive half cycle of the sample waveform, the −PWM command will be positively disabled.

When the sample waveform is in its negative cycle, the same analysis applies, but the result being a high −ENABLE output from op amp 62 and the output of −SIGNAL from AND gate 78 to control logic circuit 32. Hence, during the negative half cycle of the sample waveform, the +PWM command will be positively disabled.

+SIGNAL and −SIGNAL now serve the same function within control logic circuit 32 as +PWM and −PWM did in the referenced patent.

Accordingly, the present invention provides for a means for filtering out unwanted logic signals to control logic circuit 33 that are a result of noise and logic malfunction.

FIG. 3 illustrates an alternate connection scheme of the invention within the schematic of FIG. 2 of the referenced patent to filter out unwanted noise and logic malfunction. The logic output of OR gates 82 and 84 replace logic signals −PWM and +PWM, respectively, of FIG. 2. The output of circuit 50 is again −SIGNAL and +SIGNAL which input into INVERTER gates 86 and 88 respectively. The operation of circuit 50 is the same and provides the same noise and logic malfunction filtering capabilities.

It will be understood that the particular embodiments described above are only illustrative of the principles of the present invention, and that various modifications could be made by those skilled in the art without departing from the scope and spirit of the present invention, which is limited only by the claims that follow.

What is claimed is:

1. An improved sine wave synthesis controller circuit having shoot-through protection comprising:
   (a) a first amplifier being configured so as to invert an output sine wave received from an inverter;
   (b) a second amplifier having as an input to its inverting terminal a reference sine wave and said output of said first amplifier, said second amplifier configured to an output a signal equal to an algebraic sum of said input at said inverting terminal;
   (c) a third amplifier having as an input to its inverting terminal said output of said second amplifier and said third amplifier configured so as to first differentiate and then integrate an input;
   (d) a fourth amplifier having as an input to its inverting terminal said output of said third amplifier and as an input to its non-inverting terminal a first reference voltage, and being configured so as to maintain either a first high or a first low output signal level, dependent upon the level of the said output of said third amplifier with respect to the level of the said first reference voltage;
   (e) a fifth amplifier having as an input to its non-inverting terminal said output of said third amplifier and as an input to its inverting terminal a second reference voltage, and said being configured so as to maintain either a second high or a second low output signal level, dependent upon the level of the said output of said third amplifier with respect to the level of the said second reference voltage, wherein the improvement comprises:
   (f) a sixth amplifier having as an input to its inverting terminal a reference sine waveform and being configured to output said waveform inverted by 180 degrees;
   (g) a seventh amplifier having as an input at its inverting terminal said output of said sixth amplifier and as an input to its non-inverting terminal a third reference voltage signal and being configured to function as a comparator so as to maintain a third high or a third low output signal level dependent upon the level of the input signal with respect to said third reference voltage signal;
   (h) an eighth amplifier having as an input at its non-inverting terminal said output of said sixth amplifier and as an input to its inverting terminal a fourth reference voltage signal and being configured to function as a comparator so as to maintain a fourth high or a fourth low output signal level dependent upon the level of the input signal with respect to said fourth reference voltage signal;
   (i) a first AND gate that receives as inputs said second high or second low output signal and said third high or third low output signal and outputs a fifth high or a fifth low output signal to said controller dependent upon the level of said input signals; and
   (j) a second AND gate that receives as inputs said first high or first low output signal and said fourth high or fourth low output signal and outputs a sixth high or a sixth low output signal to said controller dependent upon the level of said input signals;
   whereby unwanted transient signals on said first low signal and on said second low signal are logically inhibited from said controller.

2. An improved sine wave synthesis controller circuit having shoot-through protection comprising:
   (a) a first amplifier being configured so as to invert an output sine wave received from an inverter;
   (b) a second amplifier having as an input to its inverting terminal a reference sine wave and said output of said first amplifier, said second amplifier configured to an output a signal equal to an algebraic sum of said input at said inverting terminal;
   (c) a third amplifier having as an input to its inverting terminal said output of said second amplifier and said third amplifier configured so as to integrate Said input;
   (d) a fourth amplifier having as an input to its inverting terminal an output of said third amplifier and as an input to its non-inverting terminal a first reference voltage, and being configured so as to maintain either a first high or a first low output signal level, dependent upon the level of the said output of said third amplifier with respect to the level of the said first reference voltage;

(e) a fifth amplifier having as an input to its non-inverting terminal said output of said third amplifier and as an input to its inverting terminal a second reference voltage, and said being configured so as to maintain either a second high or a second low output signal level, dependent upon the level of the said output of said third amplifier with respect to the level of the said second reference voltage, wherein the improvement comprises:

(f) a sixth amplifier having as an input to its inverting terminal a reference sine waveform and being configured to output said waveform inverted by 180 degrees;

(g) a seventh amplifier having as an input at its inverting terminal said output of said sixth amplifier and as an input to its non-inverting terminal a third reference voltage signal and being configured to function as a comparator so as to maintain a third high or a third low output signal level dependent upon the level of the input signal with respect to said third reference voltage signal;

(h) an eighth amplifier having as an input at its non-inverting terminal said output of said sixth amplifier and as an input to its inverting terminal a fourth reference voltage signal and being configured to function as a comparator so as to maintain a fourth high or a fourth low output signal level dependent upon the level of the input signal with respect to said fourth reference voltage signal;

(i) a first AND gate that receives as inputs said second high or second low output signal and said third high or third low output signal and outputs a fifth high or a fifth low output signal to said controller dependent upon the level of said input signals; and (j) a second AND gate that receives as inputs said first high or first low output signal and said fourth high or fourth low output signal and outputs a sixth high or a sixth low output signal to said controller dependent upon the level of said input signals;

whereby unwanted transient signals on said first low signal and on said second low signal are logically inhibited from said controller.

3. An improved sine wave synthesis controller circuit having shoot-through protection comprising:

(a) a first amplifier being configured so as to invert an output sine wave received from an inverter;

(b) a second amplifier having as an input to its inverting terminal a reference sine wave and said output of said first amplifier, said second amplifier configured to an output a signal equal to an algebraic sum of said input at said inverting terminal;

(c) a third amplifier having as an input to its inverting terminal said output of said second amplifier and said third amplifier configured so as to differentiate said input;

(d) a fourth amplifier having as an input to its inverting terminal an output of said third amplifier and as an input to its non-inverting terminal a first reference voltage, and being configured so as to maintain either a first high or a first low output signal level, dependent upon the level of the said output of said third amplifier with respect to the level of the said first reference voltage;

(e) a fifth amplifier having as an input to its non-inverting terminal said output of said third amplifier and as an input to its inverting terminal a second reference voltage, and said being configured so as to maintain either a second high or a second low output signal level, dependent upon the level of the said output of said third amplifier with respect to the level of the said second reference voltage, wherein the improvement comprises:

(f) a sixth amplifier having as an input to its inverting terminal a reference sine waveform and being configured to output said waveform inverted by 180 degrees;

(g) a seventh amplifier having as an input at its inverting terminal said output of said sixth amplifier and as an input to its non-inverting terminal a third reference voltage signal and being configured to function as a comparator so as to maintain a third high or a third low output signal level dependent upon the level of the input signal with respect to said third reference voltage signal;

(h) an eighth amplifier having as an input at its non-inverting terminal said output of said sixth amplifier and as an input to its inverting terminal a fourth reference voltage signal and being configured to function as a comparator so as to maintain a fourth high or a fourth low output signal level dependent upon the level of the input signal with respect to said fourth reference voltage signal;

(i) a first AND gate that receives as inputs said second high or second low output signal and said third high or third low output signal and outputs a fifth high or a fifth low output signal to said controller dependent upon the level of said input signals; and (j) a second AND gate that receives as inputs said first high or first low output signal and said fourth high or fourth low output signal and outputs a sixth high or a sixth low output signal to said controller dependent upon the level of said input signals;

whereby unwanted transient signals on said first low signal and on said second low signal are logically inhibited from said controller.

* * * * *